(12) United States Patent
Ligtenberg et al.

(10) Patent No.: US 7,646,613 B2
(45) Date of Patent: Jan. 12, 2010

(54) MULTI-POINT LATCH MECHANISM WITH A SINGLE CONTROL

(75) Inventors: Chris Ligtenberg, San Carlos, CA (US); Brett William Degner, Menlo Park, CA (US); Bartley K. Andre, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 561 days.

(21) Appl. No.: 11/542,873

(22) Filed: Oct. 3, 2006

(65) Prior Publication Data
US 2008/0080156 A1 Apr. 3, 2008

(51) Int. Cl.
*H05K 7/14* (2006.01)
*H05K 7/18* (2006.01)

(52) U.S. Cl. ............... 361/801; 361/728; 361/730; 361/752; 361/753; 361/759; 70/58; 70/168; 70/172; 292/33; 292/137; 292/150; 292/302

(58) Field of Classification Search ............... 361/801, 361/728, 730, 740, 747, 752, 753, 759; 292/32, 292/33, 36, 137, 139, 146, 150, 302, DIG. 11; 109/50–52; 70/58, 77, 91, 68, 106, 135, 70/141, 163, 166–173
See application file for complete search history.

(56) References Cited

U.S. PATENT DOCUMENTS

| | | | |
|---|---|---|---|
| 6,580,617 B2 * | 6/2003 | Kao | 361/759 |
| 6,588,243 B1 * | 7/2003 | Hyatt et al. | 70/278.2 |
| 6,785,141 B2 | 8/2004 | Fang | |
| 6,970,361 B2 * | 11/2005 | Jansen | 361/759 |
| 6,975,519 B2 * | 12/2005 | Siahpolo et al. | 361/798 |
| 7,209,364 B2 * | 4/2007 | Shipley et al. | 361/801 |
| 2004/0066632 A1 | 4/2004 | Fang | |
| 2006/0057879 A1 | 3/2006 | DeLuga et al. | |

\* cited by examiner

*Primary Examiner*—Dean A. Reichard
*Assistant Examiner*—Andargie M Aychillhum
(74) *Attorney, Agent, or Firm*—IP Strategy Group, P.C.

(57) ABSTRACT

A latch mechanism for removably securing a module in a bay of an electronic device. The latch mechanism includes a first wireform configured to move along a first wall of the bay to latch a first side of the module and a tang configured to move substantially perpendicularly to a second side of the module to latch the second side of the module. The latch mechanism includes a control member operatively connected with the first wireform and the tang to actuate the first wireform and the tang simultaneously in response to user input such that when the module is inserted into the bay, the first wireform and the tang simultaneously latch the first side of the module and the second side of the module.

22 Claims, 5 Drawing Sheets

MULTI-POINT LATCH MECHANISM WITH A SINGLE CONTROL

BACKGROUND OF THE INVENTION

An electronic device such as a notebook computer may include one or more removable modules such as a battery module or a data storage module (e.g., a data drive). Such a removable module is typically disposed in a bay of the electronic device and secured at one or more contact points.

If the module is secured at only one single contact point, the single contact point may need to support a substantial portion of the weight of the module during normal operation. Additionally, the single contact point may need to endure extra stress or strain in abnormal conditions such as when the electronic device is dropped. Accordingly, the single contact point and related parts may need to be quite substantial in size to provide sufficient structural support. When bulky parts are used, the cost and weight of the electronic device may be disadvantageously increased.

Further, if the module is long and slender, flatness and straightness disparity between the module and the electronic device often results in gaps and surface offsets. Such gaps and surface offsets are undesirable from a reliability and cosmetic point of view. Therefore, it is advisable that the module should be secured at multiple contact points.

Securing the module in the electronic device at multiple contact points may be accomplished by a multi-point latch mechanism such as a drop-and-slide mechanism, a multi-interaction multi-point latch mechanism, or two-way snaps or ball detents. However, such conventional multi-point latch mechanisms have various problems and disadvantages.

A drop-and-slide mechanism allows a user to drop a module into a bay of an electronic device and to slide the module along one or more rails to a secured position. Typically, such a drop-and-slide mechanism may provide, on the one or more rails, multiple contact points that share the weight of the module. As such, the above-mentioned requirements of material rigidity may be mitigated. However, drop-and-slide mechanisms tend to be inefficient with respect to space utilization. In particular, the space required for the module to slide results in wasted space in the electronic device.

A multi-interaction multi-point latch mechanism allows a user to simultaneously or sequentially operate two or more control members to actuate two or more latches to secure the module at multiple contact points. Such a mechanism typically requires two hands or multiple fingers to keep the electronic device in place and to engage or disengage latches. In performing this task, non-intuitive learning or extra caution may also be required. Some users have found such multi-interaction multi-point latch mechanisms difficult to use.

Two-way snaps and ball detents also may also secure a module at multiple contact points. Such mechanisms require a user to overcome threshold forces when installing the module into the bay or removing the module from the bay. Accordingly, the portions of the module where the user exerts force and where the module contacts the snaps or detents must withstand additional pressure and wear, necessitating a bulky construction and/or exotic or expensive material. Further, when the module is being removed from the bay, a sudden release of the module may cause the user to drop the module when threshold forces are overcome, thus potentially causing significant damage to the module.

SUMMARY

The invention relates in an embodiment to a latch mechanism for removably securing a module in a bay of an electronic device. The latch mechanism includes a first wireform configured to move along a first wall of the bay to latch a first side of the module, the first wall of the bay being substantially parallel to the first side of the module. The latch mechanism also includes a tang configured to move substantially perpendicularly to a second side of the module to latch the second side of the module, the second side of the module disposed adjacent the first side of the module. The latch mechanism further includes a control member operatively connected with the first wireform and the tang, the control member configured to actuate the first wireform and the tang simultaneously in response to user input such that when the module is inserted into the bay, the first wireform and the tang simultaneously latch the first side of the module and the second side of the module.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

One or more embodiments of the present invention involve latch mechanisms for removably securing electronic modules in receiving bays of electronic devices. One or more embodiments include a latch mechanism configured to latch an electronic module at multiple points in response to a single control action of a user. One or more embodiments include multiple latching units configured to move substantially simultaneously in a same direction in response to input of the user.

In one or more embodiments, at least one of the multiple latching units is disposed along a wireform. The wireform is configured to move along a wall of a receiving bay. The wall of the receiving bay is substantially parallel to a first side of an electronic module. The first side of the electronic module includes at least one latch channel configured to be removably engaged by the at least one of the multiple latching units, when the wireform moves along the wall of the receiving bay in a latching direction.

Alternatively or additionally, at least one of the multiple latching units is configured to move towards a second side of the electronic module, thereby removably engaging at least one receptacle on the second side of the electronic module in response to the input of the user.

The user may actuate a single control unit to drive movement of the multiple latching units through one or more interactive mechanisms such as, for example, a cam mechanism, without departing from the scope of the present invention.

The features and advantages of the present invention may be better understood with reference to the figures and discussions that follow.

Figure 1A:
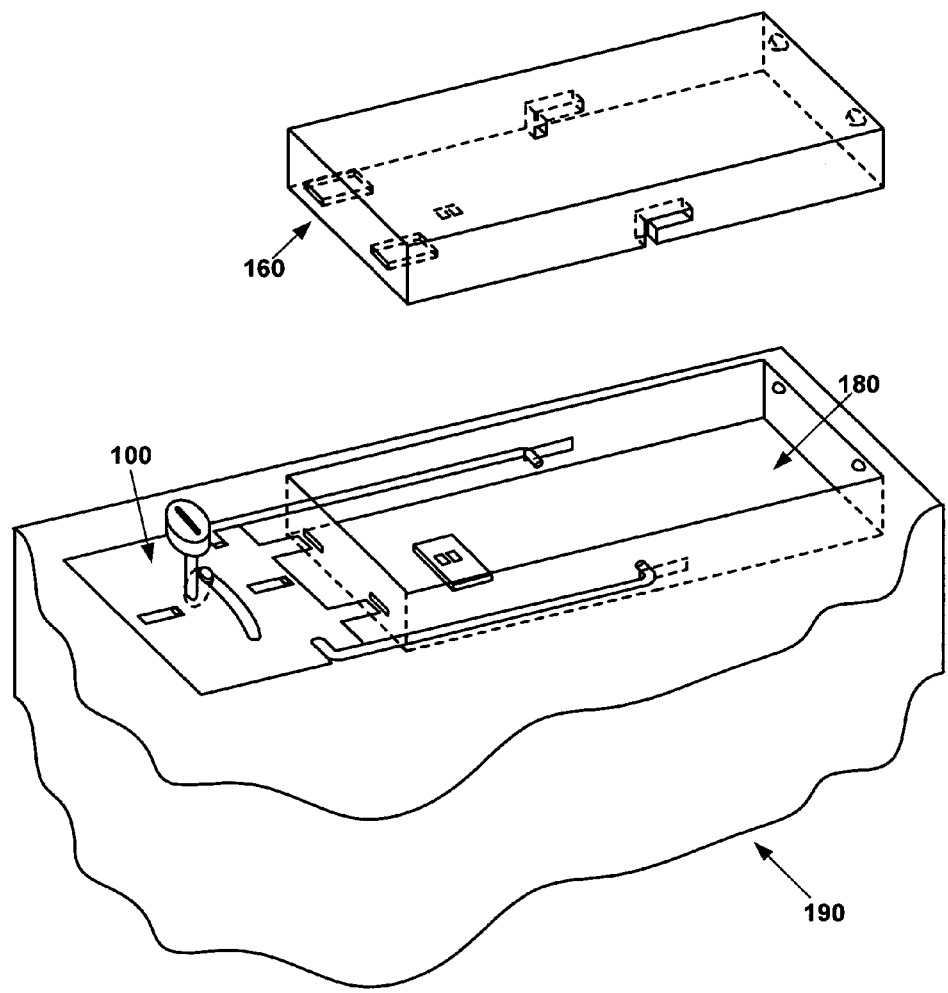
FIGS. 1A-C show an illustrative representation of a support and latch mechanism and a portion of an electronic device in accordance with one or more embodiments of the present invention.
Figure 1B:
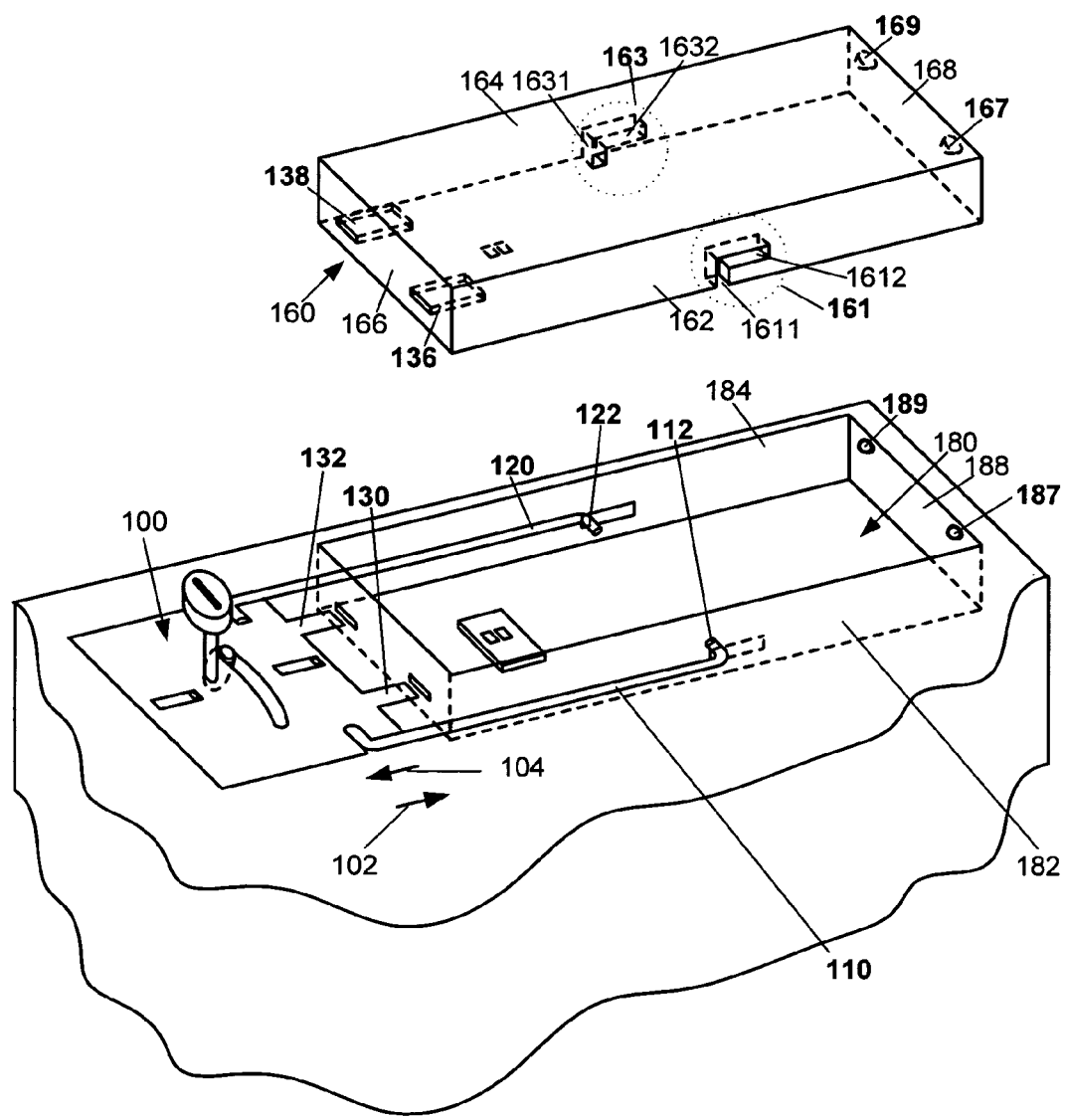
Figure 1C:
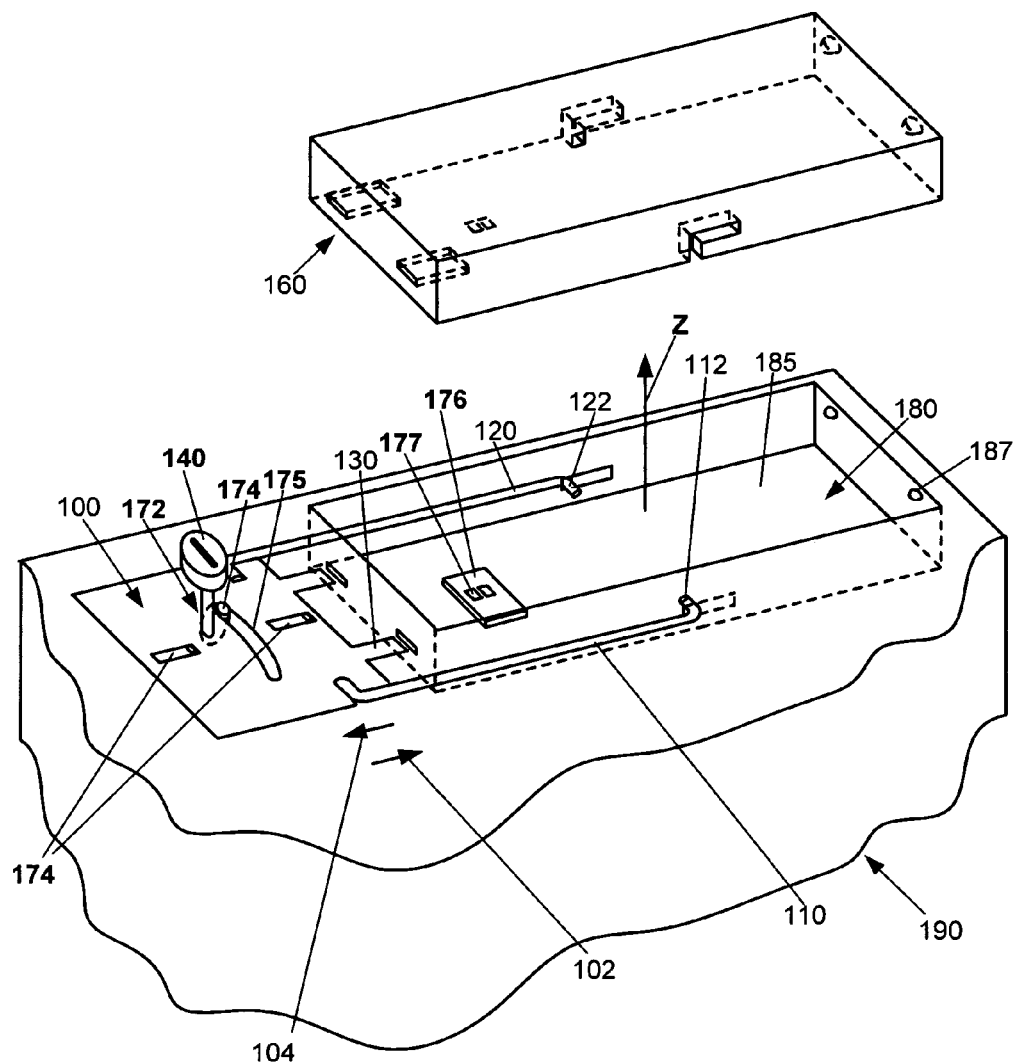

FIGS. 1A-C show an illustrative representation of a support and latch mechanism 100 (hereinafter latch mechanism 100) and a portion of an electronic device 190 in accordance with one or more embodiments of the present invention. Installed in electronic device 190, latch mechanism 100 is configured to removably secure an electronic module 160 in a bay 180 of an electronic device 190. For clear illustration, components of latch mechanism 100 which are inside electronic device 190 are shown with solid lines instead of dashed lines. In accordance with one or more embodiments, electronic module 160 includes a battery. Further, in one or more embodiments, electronic device 190 is a computer.

As shown in the example of FIG. 1B, latch mechanism 100 includes a first wireform 110 configured to latch with a first latch channel 161 disposed along a first side 162 of electronic module 160, a second wireform 120 configured to latch with a second latch channel 163 disposed along a second side 164 of electronic module 160, and a tang 130 configured to a latch with a receptacle on third side 166 of electronic module 160.

In accordance with one or more embodiments of the present invention, first wireform 110 is configured to move along a first wall 182 of bay 180. First wall 182 is substantially parallel to first side 162 of electronic module 160 when electronic module 160 is captured in bay 180.

Second wireform 164 is configured to move along a second wall 184 of bay 180, second wall 184 being substantially parallel to second side 164 of electronic module 160 when electronic module 160 is captured in bay 180. Second wall 184 is disposed opposite first wall 182.

Further, as shown in the example of FIG. 1B, first wireform 110 includes a bent end 112, bent end 112 configured to removably engage latch channel 161 on first side 162 of electronic module 160. In accordance with one or more such embodiments, as shown in the example of FIG. 1B, latch channel 161 is disposed approximately mid-way along first side 162. As further shown in the example of FIG. 1B, second wireform 120 includes a bent end 122 for removably engaging latch channel 163 on second side 164 of electronic module 160.

As can be appreciated by one of ordinary skill in the art, first and second wireforms 110 and 120 (including bent ends 112 and 122) can be readily made by a machine shop using one or more well-known processes such as, for example and without limitation, casting, welding, forming, stamping, or bending and using one or more well-known materials such as, for example, steel, aluminum, or plastic and may include one or more commercially available parts.

Tang 130 is configured to removably engage a receptacle 136 on third side 166 of electronic module 160, third side 166 being substantially perpendicular to first and second sides 162 and 164, as shown in the example of FIG. 1B. Tang 130 may be configured in any manner well-known in the art such as, for example, a pin, ridge, or protrusion, without departing from the scope of the invention.

Tang 130 can be readily made by a machine shop using one or more well-known processes such as, for example, casting, welding, forming, stamping, or bending and using one or more well-known materials such as, for example, steel, aluminum, or plastic and may include one or more commercially available parts.

Further, in some embodiments, as shown in the example of FIG. 1, latch mechanism 100 may further include an additional tang 132 for removably engaging an additional receptacle 138 on third side 166.

As further shown in the example of FIG. 1B, bay 180 includes an end-frame protrusion 187. End-frame protrusion 187 is disposed along fourth wall 188 of bay 180 and configured to removably and rotatably engage an indent 167 of a fourth side 168 of electronic module 160 such that electronic module 160 is guided during latching and supported at fourth side 168 after latching. End-frame protrusion 187 may be configured in any manner well-known in the art such as, for example, a pin, ridge, or hook, without departing from the present invention.

Further, in accordance with one or more such embodiments, bay 180 further includes an additional end-frame protrusion 189 disposed along fourth wall 188 for removably and rotatably engaging an additional indent 169 of electronic module 160.

As shown in the example of FIG. 1C, latch mechanism 100 further includes a control member 140 connected with first wireform 110, second wireform 120, and tang 130. In accordance with one or more such embodiments of the present invention, control member 140 is configured to receive a rotational user input for actuating first and second wireforms 110 and 120 and tang 130 to move in a same latching direction 102 or unlatching direction 104. Control member 140 may be configured in any manner well-known in the art such as, for example, a coin turn structure, without departing from the present invention.

Control member 140 actuates first and second wireforms 110 and 120 and tang 130 through a cam mechanism 172. Cam mechanism 172 may have a configuration that is well known in the art such as, for example and without limitation, a configuration that includes a push pin 174 and a follower structure 175, without departing from the present invention.

Control member 140 and cam mechanism 172 can be readily made by a machine shop using one or more well-known processes such as, for example, casting, welding, forming, stamping, or bending and using one or more well-known materials such as, for example, steel, aluminum, or plastic and may include one or more commercially available parts.

As further shown in the example of FIG. 1C, in accordance with one or more embodiments of the present invention, latch mechanism 100 further includes a guide mechanism 174 that is configured to limit the direction (and, in some embodiments, distance) of movement of first and second wireforms 110 and 120 and tang 130. Guide mechanism 174 may include a design well known to one of ordinary skill in the art such as, for example and without limitation, two in-line slide ways configured to slide relative to and along two corresponding guide pins, a length of the two slide ways determining the distance of the movement, and the two guide pins determining the direction of the movement.

Guide mechanism 174 can be readily made by a machine shop using one or more well-known processes such as, for example and without limitation, casting, welding, forming, stamping, or bending and using one or more well-known materials such as, for example, steel, aluminum, or plastic and may include one or more commercially available parts.

As further shown in the example of FIG. 1C, latch mechanism 100 further includes a spring mechanism 176 that may be configured to provide further stabilization of electronic module 160 when electronic module 160 is latched and ejection of electronic module 160 when electronic module 160 is unlatched. In accordance with one or more such embodiments, as shown in the example of FIG. 1C, spring mechanism 176 is disposed along bottom 185 of bay 180. Alternatively or additionally, spring mechanism 176 may be implemented on module 160. When electronic module 160 is latched, spring mechanism 176 operates to force electronic module 160 in direction Z against all of pins 112 and 122, tang 130, and end-frame protrusion 187, thereby further stabilizing electronic module 160 in place. Spring mechanism 176 may include a spring component well known to one of ordinary skill in the art such as a flat spring, torsion spring, or compression-spring-loaded tab, without departing from the scope of the present invention.

In accordance with one or more embodiments of the present invention, spring mechanism 176 may further include one or more conductive contacts 177 for providing an electrical connection between electronic module 160 and electronic device 190. In accordance with one or more such embodiments, the electrical connection may be configured to provide electrical ground, electrical power, and or other electronic signals for electronic module 160 or electronic device 190 or between electronic module 160 and electronic device 190.

Spring mechanism 176 can be readily made by a machine shop using one or more well-known processes such as, for example, casting, welding, forming, stamping, or bending and using one or more well-known materials such as, for example, steel, aluminum, or plastic and may include one or more commercially available parts.

In one or more embodiments, when electronic module 160 is latched by latch mechanism 100, electronic module 160 is stably and removably engaged by at least six points on four sides. At the same time, bay 180 is mechanically reinforced at its four walls by the four sides of electronic module 160 as well as by pins 112 and 122 and tangs 130 and 132. As a result, gaps between electronic module 160 and electronic device 190 are "stitched" at multiple points, and the overall system formed by electronic module 160 and electronic device 190 has a reinforced structure that may better withstand stress and strain, for example, during rough handling.

In accordance with one or more embodiments of the present invention, with reference to FIGS. 1A-C, to removably secure electronic module 160 in bay 180, a user may first turn control member 140 such that latch mechanism 100 is in a ready position to facilitate insertion of pins 112 and 122 into channel portions 1611 and 1631 respectively when electronic module is dropped in from above. In an embodiment, the user may turn control member 140 such that latch mechanism 100 cannot move further in unlatching direction 104. Next, the user may apply indents 167 and 169 to protrusions 187 and 189. Next, the user may rotate downward electronic module 160 into bay 180 about a pivot provided by protrusions 187 and 189.

Next, the user may exert and hold a downward pressure on electronic module 160 such that spring mechanism 176 is compressed. As a result, bent end 112 slides along a first portion 1611 of latch channel 161 to a position that substantially align with a second portion 1612 of latch channel 161, and bent end 122 slides along a first portion 1631 of latch channel 163 to a position that substantially aligns with a second portion 1632 of latch channel 163.

Next, the user may turn control member 140 such that first and second wireforms 110 and 120 and tangs 130 and 132 move in latching direction 102 to move pins 112 and 122 and tangs 130 and 132 to the ends of their engage corresponding latch channels 161 and 163 and receptacles 136 and 138. Then, the user may remove the pressure from electronic module 160. As a result, electronic module 160 is stably and removably engaged at six points at its four sides. At the same time, bay 180 is mechanically reinforced at its four walls by the four sides of electronic module 160 as well as pins 112 and 122 and tangs 130 and 132.

Thus, embodiments of the invention allow the user to engage multi-point locking on a module (such as electronic module 160) using a single drop-and-latch motion (such as rotatably depositing the module into the bay and turning the single coin turn mechanism to latch at multiple points). In an advantageous manner, one end is engaged by the indents/protrusions (e.g., 167/187 and 169/189), one end is engaged by tangs (e.g., 130 and 132), and the two sides are engaged by the wireforms (e.g., 112 and 122). Further, the latch mechanism 110 is positioned such that at least a portion of the latch mechanism 110 nests within the structural frame of the system. With reference to FIG. 1B, for example, most or all of the portion of the latch mechanism 110 that is to the left of tangs 130 and 132 (in the direction of the cam) can be nested or sandwiched in between other structural, electrical or mechanical components, thereby greatly reduce the space requirement to implement.

Figure 2:
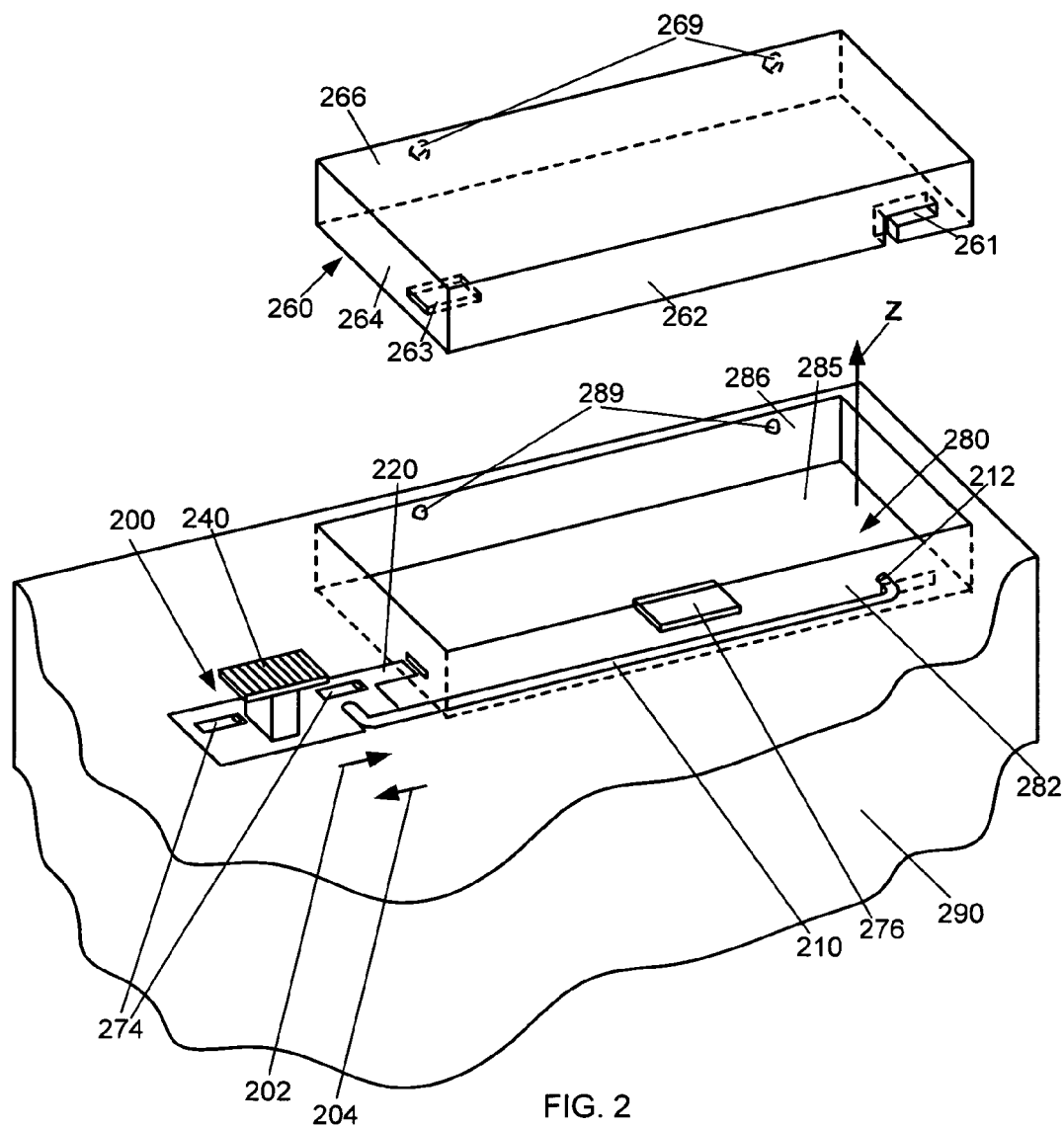
FIG. 2 shows an illustrative representation of a latch mechanism and a portion of an electronic device in accordance with one or more embodiments of the present invention.

FIG. 2 shows an illustrative representation of a latch mechanism 200 in accordance with one or more embodiments of the present invention. Latch mechanism 200 is configured to removably secure an electronic module 260 in a bay 280 of an electronic device 290 (only a portion of electronic device 290 being shown). For clear illustration, components of latch mechanism 200 inside electronic device 290 are shown with solid lines instead of dashed lines.

As shown in the example of FIG. 2, latch mechanism 200 includes a first latching member 210 configured to latch with a mating structure on a first side 262 of electronic module 260, a second latching member 220 configured to latch with a mating structure on a second side 264 of electronic module 260, second side 264 being adjacent to and substantially perpendicular to first side 262, and a control member 240 for actuating first and second latching members 210 and 220.

First latching member 210 is configured to move along a first wall 282 of bay 280 to latch first side 262. First wall 282 is substantially parallel to first side 262 when electronic module 260 is disposed in bay 280. Further, first latching member 210 includes a pin 212 for removably engaging a latch channel 261. Latch channel 261 is disposed near an end of first side 262 of electronic module 260, the end being distal second side 264 that is configured to be engaged by second latching member 220.

Second latching member 220 has a form of a tang and is configured to removably engage a receptacle 263. Receptacle 263 is disposed on second side 264 and near the intersection of first and second sides 262 and 264.

Control member 240 is connected with first and second latching members 210 and 220. In accordance with one more embodiments of the present invention, control member 240 includes a slider. In response to a translational input, control member 240 actuates first and second latching members 210 and 220 to move in a same latching direction 202 or unlatching direction 204.

As further shown in the example of FIG. 2, in accordance with one or more embodiments of the present invention, bay 280 includes two protrusions 289. Protrusions 289 are disposed along a third wall 286 of bay 280 and are configured to removably engage two indents 269, respectively. Indents 269 are disposed along a third side 266 of electronic module 260 and near two ends of third side 266.

In accordance with one or more embodiments of the invention, bay 280 includes a mid-frame protrusion (not shown), the mid-frame protrusion configured to removable engage a mid-frame indent (not shown) that is disposed approximately mid-way along third side 266 of electronic module 260.

As further shown in the example of FIG. 2, latch mechanism 200 further includes a spring mechanism 276 that may be configured to provide further stabilization of electronic module 260 when electronic module 260 is latched and ejection of electronic module 260 when electronic module 260 is unlatched. Spring mechanism 276 is disposed along a bottom 285 of bay 280 and near first wall 282. When electronic module 260 is latched, spring mechanism 276 pushes electronic module 260 in a direction Z against at least one of pin 212 and tang 222, thereby further stabilizing electronic module 260 in place.

In one or more embodiments, when electronic module 260 is latched by latch mechanism 200, electronic module 260 is stably and removably secured at four points near its four corners on three sides 262, 264, and 266. In accordance with one or more such embodiments, the user may use only one hand in a latching action by operating control member 240 with a thumb while exerting downward pressure on electronic module 260 with one or more of the other fingers.

In accordance with one or more embodiments of the present invention, first latching member 210 includes one or more pins in addition to pin 212. The one or more pins are configured to removably engage one or more latch channels along first side 262.

Further, in accordance with one or more embodiments of the present invention, latch mechanism 200 includes one or more additional tangs. For example, the one or more additional tangs may be disposed parallel to second latch member 220 and may be configured to removably engage one or more additional receptacles disposed along second side 264.

Figure 3:
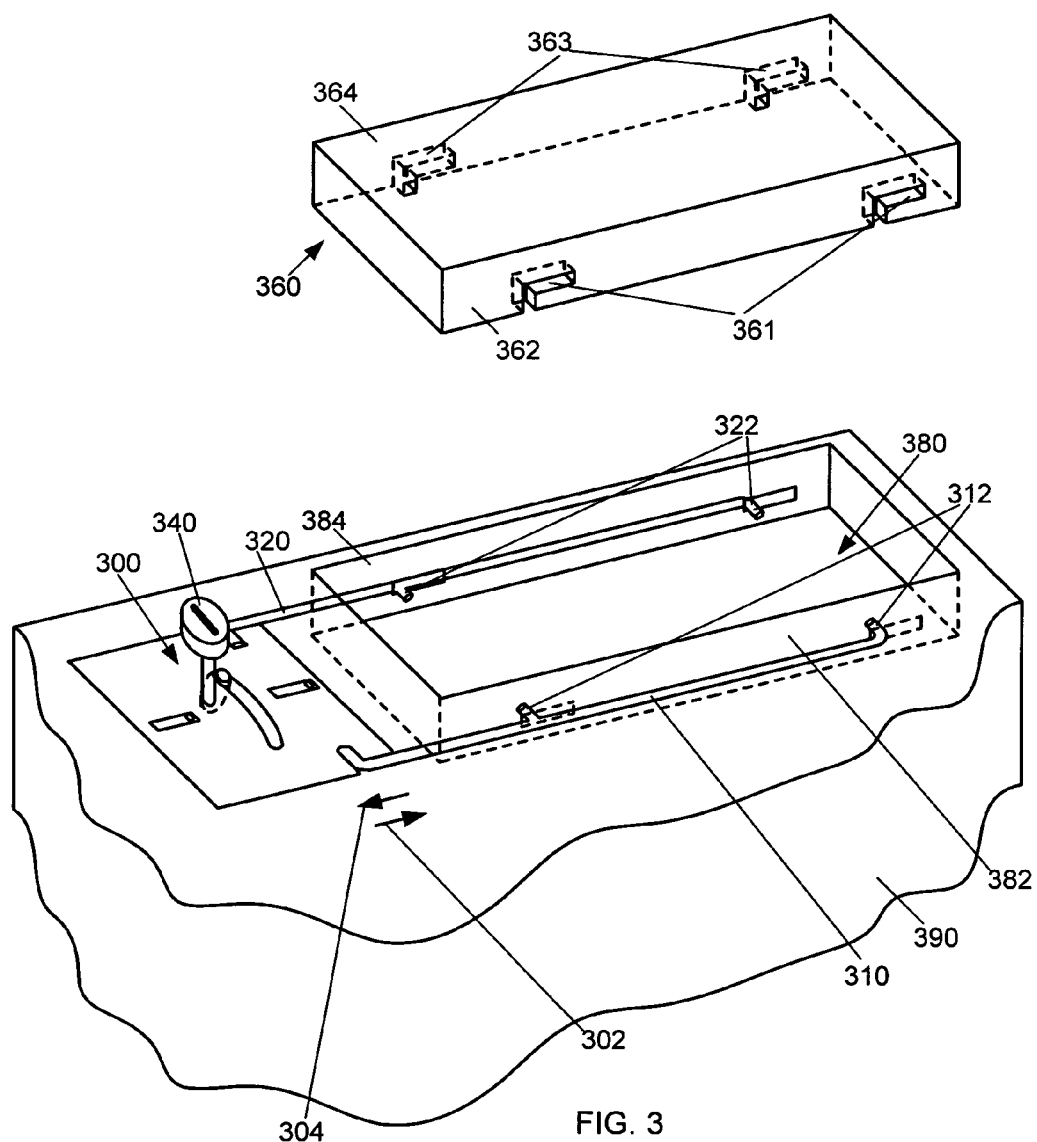
FIG. 3 shows an illustrative representation of a latch mechanism and a portion of an electronic device in accordance with one or more embodiments of the present invention.

FIG. 3 shows an illustrative representation of a latch mechanism 300 in accordance with one or more embodiments of the present invention. Latch mechanism 300 is configured to removably secure an electronic module 360 in a bay 380 of an electronic device 390 (only a portion of electronic device 390 being shown). For clear illustration, components of latch mechanism 300 inside electronic device 390 are shown with solid lines instead of dashed lines.

As shown in the example of FIG. 3, latch mechanism 300 includes a first latching member 310 configured to latch a first side 362 of electronic module 360, a second latching member 320 configured to move along a second wall 384 of bay 380 to latch a second side 364 of electronic module 360, and a control member 340 for actuating first and second latching members 310 and 320. Second wall 384 is substantially parallel to second side 364 when electronic module 360 is disposed in bay 380, and second side 364 is opposite first side 362.

First latching member 310 is configured to move along a first wall 382 of bay 380 to latch first side 362 of electronic module 360. First wall 382 is substantially parallel to first side 362 when electronic module 360 is disposed in bay 380. Further, first latching member 310 includes pins 312, which may include a bent end of first latching member 310. Pins 312 are configured to removably engage latch channels 361 that are disposed along first side 362 when first latching member 310 moves in a latching direction 302.

Second latching member 320 is configured to move along a second wall 384 of bay 380 to latch a second side 364 of electronic module 360, second side 364 being opposite first side 362. Second wall 384 is substantially parallel to second side 364 when electronic module 360 is disposed in bay 380. Further, second latching member 320 includes pins 322. Pins 322 are configured to removably engage latch channels 363 that are disposed along second side 364 when second latching member 320 moves in latching direction 302.

In accordance with one or more such embodiments, latch channels 361 and 363 include latch channels that are disposed near ends of first and second sides 362 and 364, respectively, so that electronic module 360 is latched near its four corners.

Further, in accordance with one or more embodiments of the present invention, pins 312 includes a mid-frame pin (not shown) and latch channels 361 includes a mid-frame latch channel (not shown), the mid-frame latch channel disposed approximately mid-way of first side 362, so that electronic module 360 is latched and bay 380 is supported, respectively, at a mid-frame point.

Control member 340 is connected with first and second latching members 310 and 320. Control member 340 may include a coin turn and a cam mechanism. In response to rotational user input, control member 340 actuates first and second latching members 310 and 320 to move in a same latching direction 302 or unlatching direction 304.

When electronic module 360 is latched by latch mechanism 300, electronic module 360 is stably and removably secured at least near its four corners on opposite first and second sides 362 and 364.

As can be appreciated from the foregoing, embodiments of the present invention enable simple and convenient user control for latching an electronic module. The embodiments provide stable and secure latching at multiple points and multiple sides of the electronic module with a single control action. One or more of the embodiments may provide mechanically reinforced structure of the electronic device with inter-locking of the latch mechanism, the electronic module, and the structure of the electronic device.

With a small number of parts, embodiments of the present invention may be implemented economically and space-efficiently. Further, with load sharing of weight of the electronic module, embodiments of the present invention may be made with light-weight material that enables light-weight designs of electronic devices.

While this invention has been described in terms of several embodiments, there are alterations, permutations, and equivalents, which fall within the scope of this invention. For example, although two mid-point wireforms are shown (one per side), there may be as many wireforms per side as desired. As another example, although one side of the module (e.g., the side that is distal from the coin turn mechanism) is described to be engaged by protrusions/indents, it is also possible to provide sliding tangs with latch mechanism 110 to engage with recesses in that side as well. As a further example, although the module to be latched is described as an electronic module, it may represent any mechanical, electrical and/or electromechanical module or component that may require latching in a bay in another device. As another example, the term "wireform" does not denote any particular cross-sectional shape and a wireform may have a round cross-section, a rectangular cross-section, a square cross-section, or any other cross-sectional shape.

It should also be noted that there are many alternative ways of implementing the methods and apparatuses of the present invention. Furthermore, embodiments of the present invention may find utility in other applications. The abstract section is provided herein for convenience and, due to word count limitation, is accordingly written for reading convenience and should not be employed to limit the scope the claims. It is therefore intended that the following appended claims be interpreted as including all such alterations, permutations, and equivalents as fall within the true spirit and scope of the present invention.

What is claimed is:

1. A latch mechanism for removably securing a module in a bay of an electronic device, the latch mechanism comprising:
    a first wireform configured to move along a first wall of the bay to latch a first side of the module, the first wall of the bay being substantially parallel to the first side of the module;
    a tang configured to move substantially perpendicularly to a second side of the module to latch the second side of the module, the second side of the module disposed adjacent the first side of the module; and
    a control member connected with the first wireform and the tang, the control member to actuate the first wireform and the tang simultaneously in response to user input such that when the module is inserted into the bay, the first wireform and the tang simultaneously latch the first side of the module and the second side of the module.

2. The latch mechanism of claim 1 further comprising a second wireform connected with the control member and configured to move along a second wall of the bay to latch a third side of the module, the second wall of the bay being substantially parallel to the third side of the module, the second wall of the bay disposed opposite the first wall of the bay and wherein the second wireform also simultaneously latch the third side of the module in response to the user input.

3. The latch mechanism of claim 1 wherein the bay comprises at least one of an end-frame protrusion and an indent, the at least one of the end-frame protrusion and the indent disposed along a third wall of the bay and configured to removably engage another of the at least one of the end-frame protrusion and the indent disposed along a fourth side of the module, the third wall of the bay being substantially parallel to the fourth side of the module, the fourth side of the module being opposite the second side of the module.

4. The latch mechanism of claim 1 wherein the bay comprises a protrusion, the protrusion configured to removably engage an indent of a third side of the module, the third side of the module disposed opposite the first side of the module.

5. The latch mechanism of claim 1 wherein the first wireform comprises at least one of a bent end and a pin, the at least one of the bent end and the pin configured to removably engage at least one latch channel disposed along the first side of the module when the first wireform moves in a latching direction.

6. The latch mechanism of claim 1 wherein the first wireform and the tang are formed from a single piece of metal.

7. The latch mechanism of claim 1 wherein the control member actuates the first wireform and the tang through a cam mechanism.

8. The latch mechanism of claim 1 wherein the control member is configured to receive at least one of a rotational user input and a translational user input.

9. The latch mechanism of claim 1 further comprising a spring mechanism disposed along at least one of a bottom of the module and a bottom of the bay, the spring mechanism forcing the module against at least a portion of the first wireform, the second wireform, or the tang when the module is latched.

10. The latch mechanism of claim 1 wherein the module represents a battery.

11. The latch mechanism of claim 1 wherein the module represents a data storage component.

12. The latch mechanism of claim 2 wherein at least a portion of the latch mechanism being nested between other components of the electronic device when the latch mechanism is slidably moved to unlatch the module.

13. The latch mechanism of claim 9 wherein the spring mechanism comprises a conductive contact, the conductive contact configured to electrically couple the module and the electronic device.

14. An electronic device comprising:
    a module;
    a bay configured to house the module; and
    a latch mechanism for latching the module and reinforcing the bay, the latch mechanism comprising:
        a first wireform configured to slide along a first wall of the bay to engage a first side of the module in a latched state,
        a second wireform configured to slide along a second wall of the bay to engage a second side of the module in the latched state, the second wall disposed opposite the first wall,
        a tang configured to move substantially perpendicular to a third wall of the bay to engage a third side of the module in the latched state, the third wall being perpendicular with both the first wall and the second wall, and
        a control member connected with the first wireform, the second wireform and the tang, the control member to receive at least one of rotational user input and translational user input to actuate the first wireform, the second wireform, and the tang simultaneously when transitioning from an unlatched state to the latched state.

15. The electronic device of claim 14 wherein the first wireform includes at least one of a first pin and a first bent end, the at least one of the first pin and the first bent end configured to slide into a first latch channel disposed in the first side of the module when transitioning from the unlatched state to the latched state to removably engage the first side of the module.

16. The electronic device of claim 14 wherein at least a portion of the latch mechanism is nested between other components of the electronic device when the latch mechanism is slidably moved from the latched state to the unlatched state.

17. The electronic device of claim 15 wherein the first wireform includes at least one of a first additional pin and a first additional bent end, the at least one of the first additional pin and the first additional bent end configured to slide into a first additional latch channel disposed in the first side of the module when transitioning from the unlatched state to the latched state to removably engage the first side of the module.

18. The electronic device of claim 15 wherein the second wireform includes at least one of a second pin and a second bent end, the at least one of the second pin and the second bent end configured to slide into a second latch channel disposed in the second side of the module when transitioning from the unlatched state to the latched state to removably engage the second side of the module.

19. The electronic device of claim 18 wherein the second wireform includes at least one of a second additional pin and a second additional bent end, the at least one of the second additional pin and the second additional bent end configured to slide into a second additional latch channel disposed in the second side of the module when transitioning from the unlatched state to the latched state to removably engage the second side of the module.

20. The electronic device of claim 18 wherein the first latch channel is disposed in between ends of the first side and wherein the second latch channel is disposed in between ends of the second side.

21. The electronic device of claim 18 wherein the first latch channel is disposed approximately half way between ends of the first side and wherein the second latch channel is disposed approximately half way between ends of the second side.

22. The electronic device of claim 18 further comprising a spring mechanism configured to force the first and second latch channels against the first and second pins, respectively, when the first and second pins removably engage the first and second latch channels in the latched state.

* * * * *

UNITED STATES PATENT AND TRADEMARK OFFICE
CERTIFICATE OF CORRECTION

| | | |
|---|---|---|
| PATENT NO. | : 7,646,613 B2 | Page 1 of 1 |
| APPLICATION NO. | : 11/542873 | |
| DATED | : January 12, 2010 | |
| INVENTOR(S) | : Chris Ligtenberg et al. | |

It is certified that error appears in the above-identified patent and that said Letters Patent is hereby corrected as shown below:

Title page, item (*) Notice: Subject to any disclaimer, the term of this patent is extended or adjusted under 35 U.S.C. 154(b) by 561 days.

Delete the phrase "by 561 days" and insert -- by 662 days --.

In column 5, line 34, delete "and or" and insert -- and/or --, therefor.

In column 7, line 65, after "362" insert -- . --.

In column 8, line 65, delete "electromechanical" and insert -- electro-mechanical --, therefor.

Signed and Sealed this

Fourteenth Day of September, 2010

David J. Kappos
*Director of the United States Patent and Trademark Office*